United States Patent
Goranowski

(10) Patent No.: US 6,707,447 B1
(45) Date of Patent: Mar. 16, 2004

(54) THERAPEUTIC AND COMPUTER INPUT GAUNTLET

(76) Inventor: Richard Goranowski, 2425 S. Culpeper, Arlington, VA (US) 22206

( * ) Notice: Subject to any disclaimer, the term of this patent is extended or adjusted under 35 U.S.C. 154(b) by 0 days.

(21) Appl. No.: 09/205,111

(22) Filed: Dec. 3, 1998

Related U.S. Application Data

(60) Provisional application No. 60/067,494, filed on Dec. 4, 1997.

(51) Int. Cl.[7] .................................................. G09G 5/08
(52) U.S. Cl. .................. 345/167; 345/157; 345/158; 345/161; 341/20; 341/21
(58) Field of Search ................................. 345/156, 158, 345/161, 167; 341/20, 21

(56) References Cited

U.S. PATENT DOCUMENTS

| | | | | |
|---|---|---|---|---|
| 4,988,981 A | * | 1/1991 | Zimmerman et al. | 340/709 |
| 5,444,462 A | * | 8/1995 | Wambach | 345/167 |
| 5,880,712 A | * | 3/1999 | Goldman | 345/168 |
| 5,986,643 A | * | 11/1999 | Harvill et al. | 345/156 |
| 6,097,369 A | * | 8/2000 | Wambach | 345/158 |
| 6,154,199 A | * | 11/2000 | Butler | 345/167 |

* cited by examiner

Primary Examiner—Richard Hjerpe
Assistant Examiner—Ali Zamani

(57) ABSTRACT

A computer input device is provided which is programmable to DOS and Windows programs that have mouse function capability. The mouse function is configured as a ball-mouse familiar to CAD-CAM, positioned like a baseball in a mitt and opposably manipulated by each thumb. The device communicates with a computer mainframe or network configuration, by molding the flat 101 IBM Keyboard into the glove conforming to the opposable grasp of the human hand, whose intradigital keystrokes are assigned by the "touch" system of typewriter input. The 101 IBM keyboard is decimated bilaterally into the interdigital gloves of eight fingers and two thumbs, incorporating the ball-mouse attribute. A "treatment gauntlet" immobilizes and manipulates the hand-wrist-elbow in several treatment modalities palliative of carpal tunnel syndrome. Further treatment modalities extend to an exoskeletal enclosure or "activity cage" that supports and suspends the operator via a system of pulleys, springs and magnetic attraction-repulsion, and applies programmed musculoskeletal resistance against which the operator perceives system feedback approximating sensory touch and manipulation.

8 Claims, 5 Drawing Sheets

THERAPEUTIC AND COMPUTER INPUT GAUNTLET

CROSS-REFERENCE TO RELATED APPLICATIONS

This application corresponds to provisional application Serial No. 06/067,494; filed Dec. 4, 1997 entitled "TREATMENT GAUNTLETS AND COMMUNICATING THUMB-MOUSE GLOVES FOR WORD PROCESSING AND CAD/CAM PROGRAM ACTUATION."

TECHNICAL FIELD

The present invention relates to computer input devices.

BACKGROUND ART

Standard computer data input device such as exemplified by a conventional keyboard, have stagnated in development, whereas computer science has evolved exponentially. For example, U.S. Pat. No. 5,444,462 1995 to Wambach teaches cursor control of both DOS and Windows screen-keyboard interface applications effected by a hand gestured mouse and click actuators located on each digit and actuated by opposable thumb contact. Several patents address ambidextrous keyboard manipulation, i.e., Dolenc, U.S. Pat. No. 4,849,732, 1989 "One hand key shell"; Matthews, U.S. Pat. No: 5,432,510 1995, "Ambidextrous single hand chordic data management device.

Related patents do not appear to teach in-use word processing and CAD/CAM program application designated to their data input electronics and architectural claims. For example, see Zimmerman, et al. U.S. Pat. No. 4,988,981 1991 "Computer data entry and manipulation apparatus and method"; Grimes, U.S. Pat. No. 4,414,537 1983 "Digital data entry glove interface device"; Penner, U.S. Pat. No. 4,908,001 1990, "Hand held finger movement actuated communication devices and systems employing such devices"; Robinson, U.S. Pat. No. 4,613,139 1986, Video Control Gloves; and Horn, U.S. Pat. No. 5,552,782 1996, "Single-hand mounted and operated keyboard."

Moreover, palliation and cure of orthopedic-neurogenic syndromes secondary to repetitive tasks in word processing has been addressed by several prior art patents: Choi, U.S. Pat. No. 5,481,263 1996, "Computer with separate left hand and right hand operated keyboard units," Lahr, U.S. Pat. No. 4,661,005, "Splittable keyboard," and Gambaro, U.S. Pat. No. 5,178,477 1993, "Ergonomic keyboard input device," the latter two having been reduced to practice as consumer items [PC Magazine, May 25, 1993 p.126]. The Gambaro patent is marketed as an unsplit unitary IBM 101 keyboard while the Lahr and Choi IBM 101 boards are bimanually split.

Moreover, patents exist in other art areas, notably from medical prosthetic devices designed to treat carpal tunnel syndrome generally, to which the instant patent teaches pneumatic wrist immobilization and automated massage; pinpoint HVAC temperature variation, magnetic imaging feedback techniques actuating thermostat and subcutaneous injection ports distributed through such treatment gauntlet dosed and aimed by the magnetic resonance imaging/CAT monitor taught as such treatment gauntlet/health prosthetic appliance. For example, see Gates, U.S. Pat. No. 5,454,380 1995, Ergonomic hand support for use during a work operation to prevent the risk of adverse medical conditions, such as carpal tunnel syndrome"; Sucher, U.S. Pat. No. 5,256,136 1993, "Carpal tunnel appliance." Neither Gates nor Sucher teaches addressing a word processing working milieu.

DISCLOSURE OF INVENTION

The present device promotes an upgrade capability whereby a program signal visualized by virtual reality viewscreens simultaneously feeds back pressure and creates an artificial sensation of touch, communicated via slight electroshock and pneumatic pressure borrowed from the supportive gauntlet. An embodiment, moreover, is provided where guidon arms following the track of the MRI "wheel" shall communicate and be themselves suspended from, a pulley mechanism connected to and controlled by the main drive element of the virtual reality event tree, shall virtually suspend the upper extremities in program coordination with the virtual visual field, thereby effecting external stimulation and limb-muscle actuation of the device operator. Interaction with the virtual environment is thereby claimed, for instance, featuring the ability to engage in electronic fencing matches as a "cyber-saber," as well as in board games such as chess, where real-time opponents manipulate by means of virtual reality touch afforded by the feedback apparatus described, infra, telephonically communicated by similar machines from miles away, or by means of internally pre-programmed riposte.

Stress-reducing "wrist supports" are common appliances molded out of plastic into a keyboard tray for office secretaries; as are techniques such as propping the wrists upon cold cans of soda utilized by court transcribers, both to palliate the debilitating work-related "carpal tunnel syndrome" which is a narrowing of the bony groove through which the median nerve communicates to the hand. The syndrome is generally stress-related, caused by contraction or swelling of the bony walls of the neural tissue conduits. This syndrome, secondary to repetitive movement, onsets at identifiable neural locations, and may be reduced by application of topical cold, ultrasonic vibration, or subcutaneous injection of somatic and neuroreactive drugs. One aspect of the present invention is to provide palliation and therapy thereby for carpal tunnel syndrome within the workplace, by means of designs herein dictated by the medical research pertinent to this disability.

The present invention further provides treatment capability for carpel tunnel and other cumulative stress injuries to the wrist and hand, by providing a means for reducing the temperature of the inflated cladding surrounding the appendage during use, by means of liquid nitrogen, hydrogen, or other suitable expansion gas cryogenically released into the inflation, thereby topically cooling afflicted areas. Spray aerosol can also be pipetted to affected areas for a refreshing blast of chill over an MRI-identified "hot" spot.

Moreover, the cladding may be deflated, automatically opened and rolled back from the wrist allowing an inspection window of skin for MRI identification of suitable injection sites. The injection apparatus is mounted upon and follows, the tracks running alongside the gauntlet motivated by a small pulley.

BEST MODE FOR CARRYING OUT THE INVENTION

Figure 1:
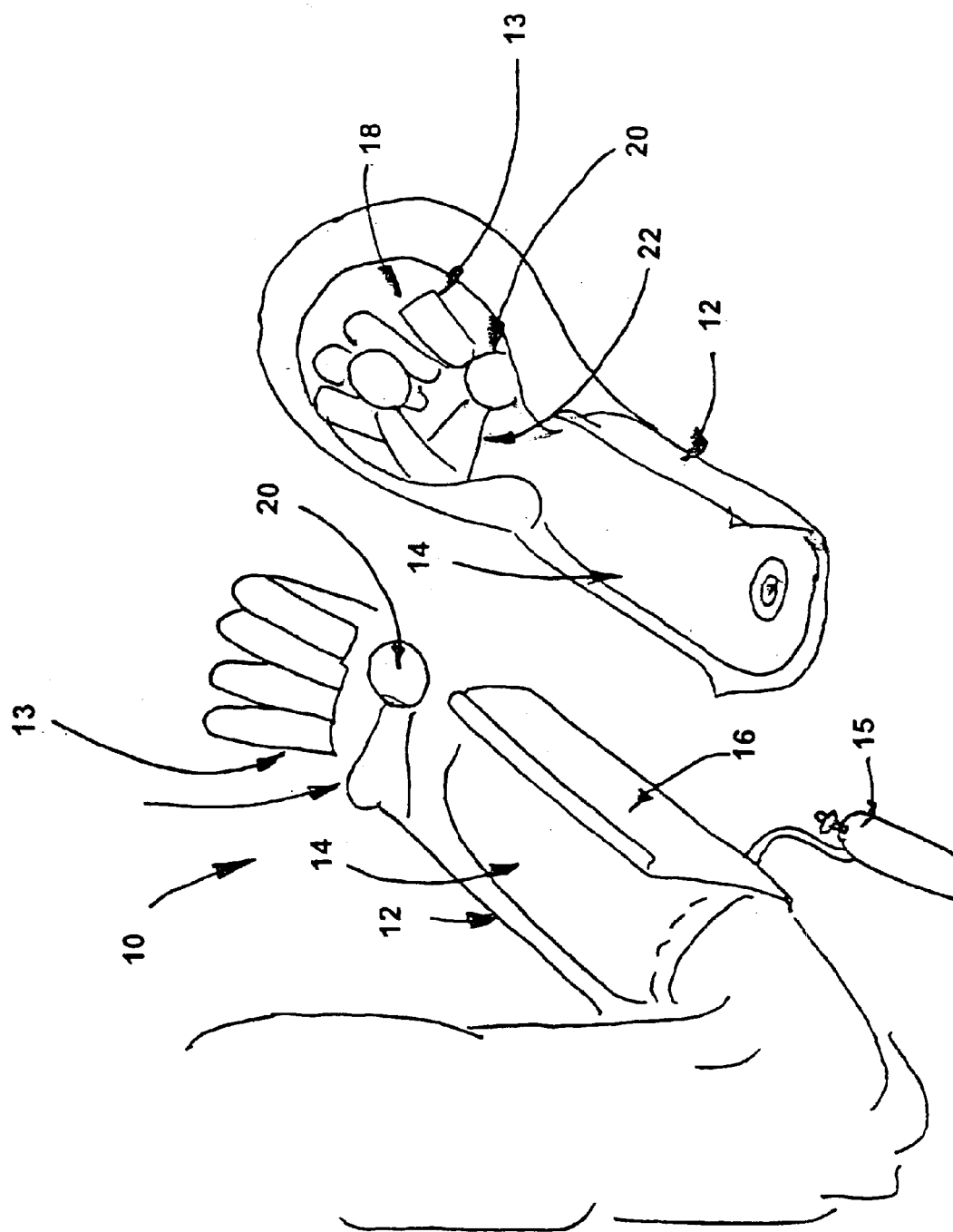
FIG. 1 is a perspective view of a wrist supported keyboard in accordance with the present invention.
Figure 2:
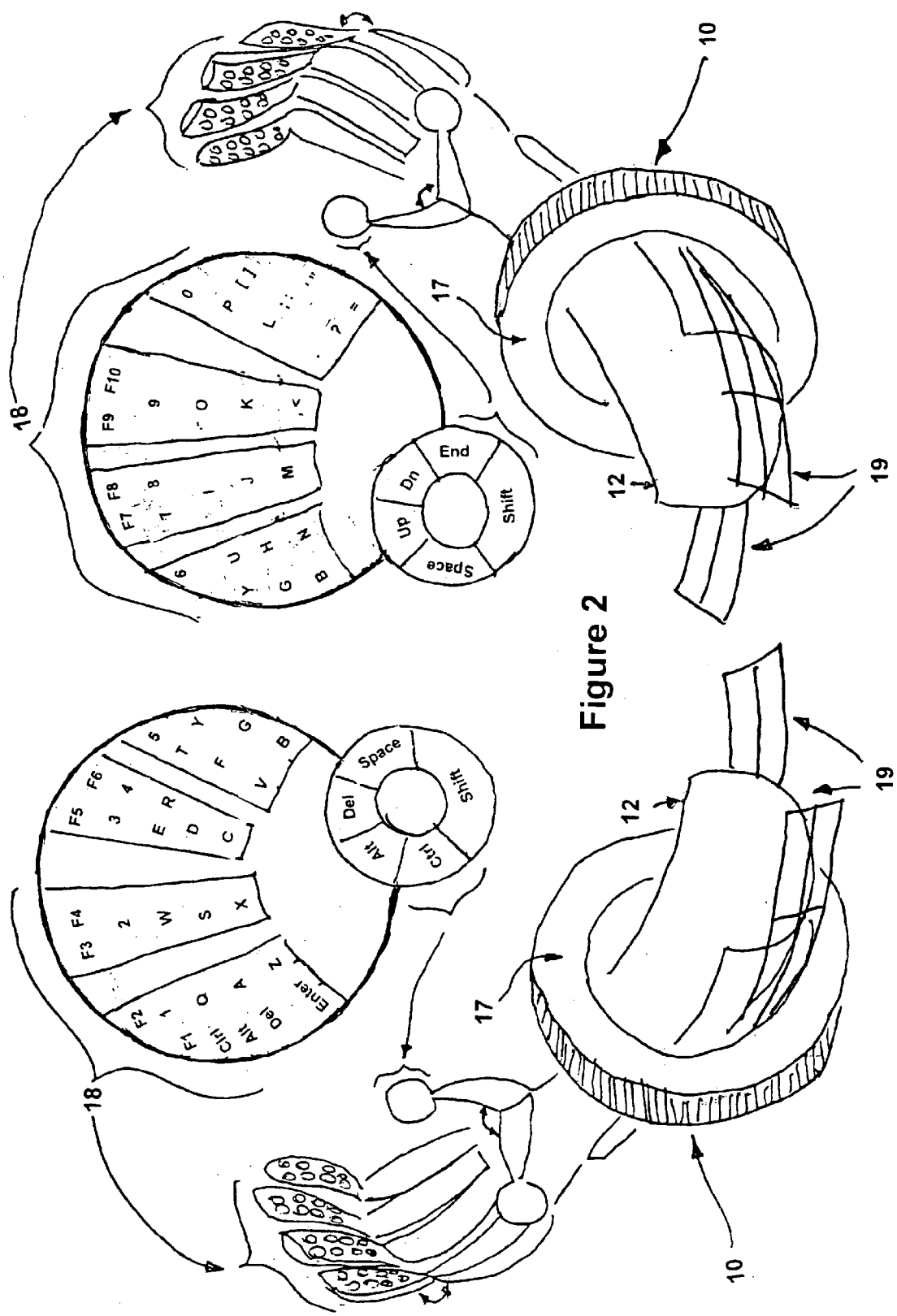
FIG. 2 is a perspective view of a second embodiment of the present invention.
Figure 3:
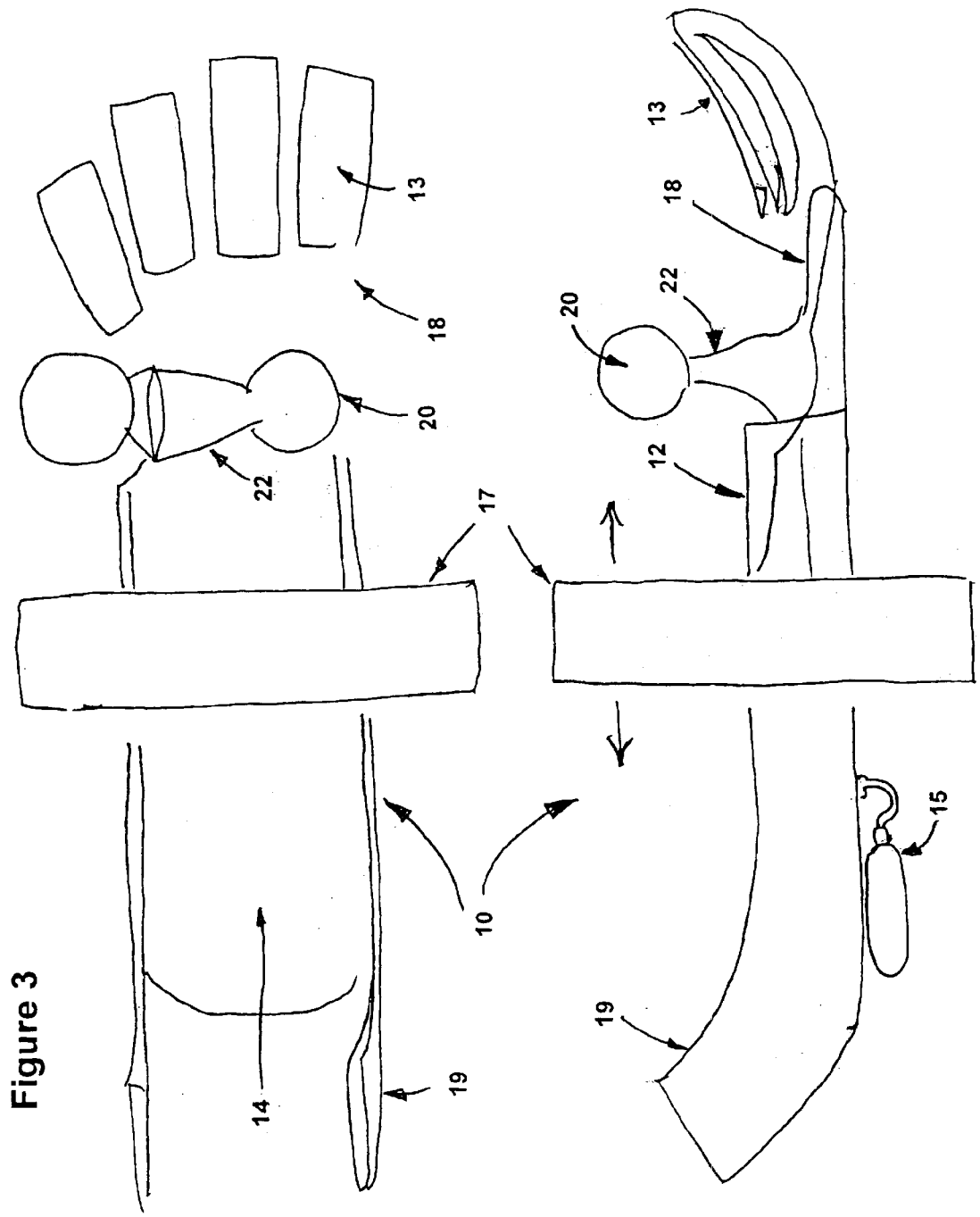
FIG. 3 is a top and side view of a third embodiment of the present invention.

Referring to FIGS 1–3, the preferred embodiment of the present invention includes a wrist support keyboard with opposable touch for the thumb, actuating a CAD-CAM mouse-ball as well as space-bar, north-south, etc. decimated 101 IBM Keyboard well-known to the art of word processing and computer database input. The mouse-ball (1) may be dilocied with a second extremity thumb-actuated mouse, or the other thumb may carry manual grip control such as the A-6 Intruder joystick (not shown). These thumb elements are made on a shaft which pinion the phalanges palm to the wrist support mechanism and enable user stretch as keyboard relief. The fingers are reined free with key actuation responsibilities, as designated by the "touch" system of QWERTY operation, actuated by photo sensors as in screen actuation, for speed, diversity and accuracy.

More specifically, a bimanual semi-elastic gauntlet 10 includes a housing 12 that is arranged to be supportive of the backhand and wrist, adjustable to the elbow, molded from plastic, metal or resin, so as to encase or clad the backhand and wrist selectively to the elbow. The housing accommodates a pneumo-vacuum bag pressurization surrounding, securing and immobilizing the wrist to the elbow with an inflatable, elastic, self-adjustable pressure wrap 14. The wrap can be adapted to include a blood-pressure monitor and topical temperature device for generating baseline readings.

The gauntlet further accommodates sites for installation of magnetic resonance imaging (MRI) sensors 16 coupled to the housing and arranged to operate in conjunction with suitable programming to provide monitoring of neuromuscular conditions, selection of data patterns that profile syndrome site activity, and to then pinpoint relief, either generally as temperature adjustment throughout the surrounding pressurized wrap such as from injection from the aforementioned liquid/gas arrangements (generally denoted as element 15 in FIGS. 1 and 3), or specifically via ultrasonic vibrator elements (not shown) calibrated and aimed by the MRI, and/or dose-metered injection ports calibrated for subcutaneous (or intravenous) absorption. The specific arrangement and operation of such relief arrangements is understood by one of ordinary skill in the art.

As shown in FIGS. 2 and 3, an MRI scanner ring 17 can be pulled by an electric motor (not shown) along a track 19.

The therapeutic gauntlet of the present invention communicates at its backhand with a bimanual glove 18 which may access actuation points appropriate to the configurations of a computer keyboard and a set of finger actuated switches 13 such as generally used with word processing and DOS based computer programs. The communication is both electronic and pneumatic, but hinged to enable hands-on override at the flick of a wrist.

The therapeutic gauntlet communicating at its backhand with the communications glove configuration may apply keyboard mapping as taught by Zimmerman et al. (the aforementioned U.S. Pat. No. 4,988,981), such that the keyboard mapping will conform to available software responsive to conventional keyboard configurations, and be upgradable to current market standards.

Moreover, the mouse-ball configuration, generally denoted as element 20, provides direct orbital communication with an on-screen cursor, instead of in two dimensions as with a conventional mouse-pad, by arranging the ball to be mounted and extendable into the palm of the communications glove, actuated by the opposing thumb of the communications glove. The ball-mouse is preferably configured to coincide with the tip reach of the thumb. Other thumb controls (not shown) can range below on the stalk (denoted as element 22) so as to mechanically and electronically support the mouse-ball. The stalk therapeutically immobilizes the phalanges of the palm, allowing only the fingers free rein. Carpal tunnel appliance "stretching" is provided by the therapeutic gauntlet of the present invention via positioning of a bar between the thumb and palm (i.e., the ball-mouse stalk) that stretches and immobilizes the thumb at its greatest angle of motility and bends the wrist back in an accredited physical therapy technique. The bending can be selectively motivated by pneumatic pressure exerted from within the plastic airbag cladding, at automatic or operator requested intervals.

The device is based upon a medical model specified by physicians treating the disability, "carpal tunnel syndrome," postulating several palliatives, including injections, temperature modification, and immobilization as treatment modalities to be utilized in connection with further diagnostic treatment peripherals as computer assisted tomography ("CAT") scans and electromyelography ("EMG") whereby miniaturization of the x-ray laser could be adaptable to a three-dimensional radiologic forearm-phalanges isolation for diagnostics in neurodysfunction as well as osteoarthritic analyses as shown in FIG. 3.

A further refinement to the pressurized nature of the comfort cladding to the wrist while in isolation, as also under a system refrigerant cycle adjustable to taste is an extension of an injection port or ports interlacing the cladding and entering through the semi-rigid plastic support sheath, to provide injectable medical media to the user as prescribed.

An extended glove embodiment provides a pressurized suit attached to the glove in similar engineering and cladding as above. This specialization optimilizes the optic, audial, smell-touch sensory seal within a user helmet, within a screen-surround sound environment with ports for caloric nourishment provided, and smell enhancers and gas inhalants. The body suit portion of the pressurized cladding is externalized by electromagnets sewn as the external layer much as armor, attached either to a plug or a Tessla coil. The specialization further optimalizes the sense of touch and balance by providing a surrounding globe of positioned electromagnets in maximum array utility as to control pitch, roll and yaw of the instrument user, when activated in concert with the user's center-of-gravity as a safe, even keel.

Laser mapping, as demonstrated at Stanford University, provided telecommunicated coordinates to a remote location wherein an intricate representation of the Buddha was coordinated in three-dimensional coordinates and reconstructed from the data. The ruby laser thus targeting the user as its center-of-gravity responsibility, thus programs through signal input user feedback, and also programs electromagnetic events involving electrorepulsive stress on user limbs actuating as touch, as equilibrium is decompensated by the program (a) to synthesize weightlessness; (b) provide a quasi-gravity platform supported by electromagnetic repulsion to provide the illusion of a level playing surface, horseback, racecar, jet, etc.

In addition, as noted above, a wrist-elbow MRI system is utilized within the wrist-elbow treatment gauntlet (a) as a diagnostic device to monitor on-line therapy; (b) as a medical diagnostic tool; fittable to and detachable from, a word processing CAD/CAM glove input; supporting claims of therapeutically related neurorelaxant injections dosed and aimed by diagnostic data from the limited MRI scan; temperature conditioning onto skin tissue and bony areas of the partially immobilized wrist and hand that show up "hot" on the MRI, and are herein taught by the present invention in application to the areas of word processing and computer data input and magnetic imaging health electronic diagnostics.

In accordance with one potential application of the present invention, a detachable pulley and track mechanism arrangement can be provided that directs and motivates a magnetic resonance imaging wheel designed and sized for arm anatomy from elbow through the wrist fitted for use in conjunction with the gauntlet of the present invention. Accordingly, an automated injection device, also directed and motivated by the pulley and track mechanism, can be controlled in situ by MRI scan data, to be lowered into penetration into the user's the skin to absorption depth or vein location and, while the forearm is locked by the pneumatic cladding, inject a programmed dosage of medication. The dosage limits would be preset by medical prescription and modifiable as to treatment plan (cortisone, gold, muscle relaxants, insulin, lethal injection, etc.). The specifics of such a detachable pulley and track mechanism do not form part of the present invention.

Figure 4:
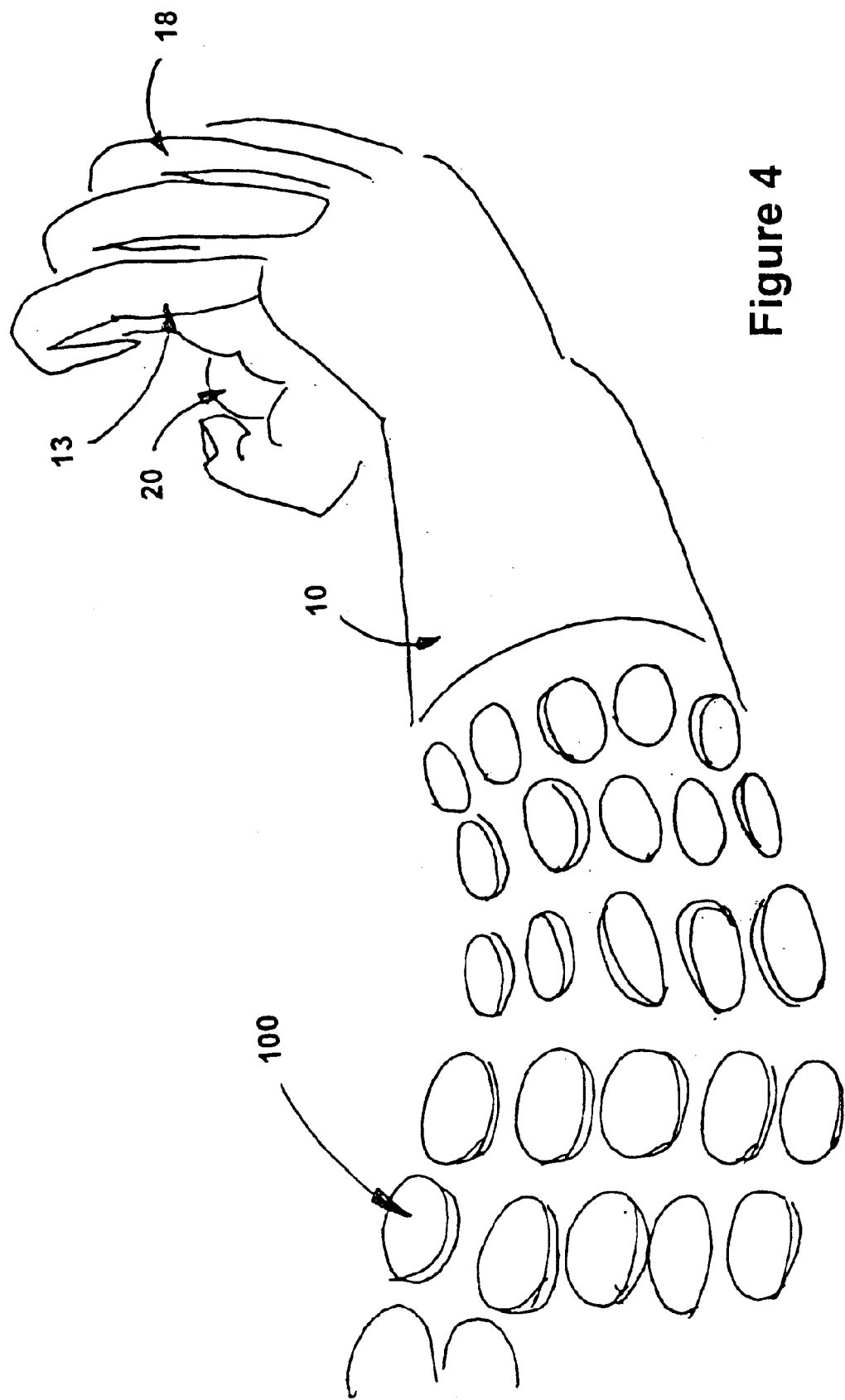
FIG. 4 is a perspective view of the fourth embodiment of the present invention.

A further embodiment of the exoskeletal pulley and track mechanism, as incorporated with the present invention device as shown in FIG. 4, applies a carpal tunnel appliance "stretching" concept to provide a therapeutic exoskeletal extension of the detachable pulley and track mechanism to enable suspension and support of the operator's full weight, inclusive of extremities in full range of motion. The exoskeletal appliance attaches to and incorporates a pressure suit 100 well known to the art of flight suit, deep-sea diving, and space suit design. The exoskeletal-pressure suit applies programmable musculoskeletal biofeedback resistance to the operator by means of counterweights, springs, and/or magnetic repulsion-attraction, sufficient to provide a programmable physical therapeutic milieu with weight-training, isometric and massage capabilities.

In yet another potential application of the present invention, a programmable virtual reality "activity cage" 102 can be operationally integrated with such a pressurized suit 100 to provide positive and negative feedback to an operator suspended in full range of motion. Such an activity cage and pressurized suit arrangement can be suitably programmed in concert with and incorporating the therapeutic gauntlet 10, as well as a diagnostic MRI/CAT scan arrangement, and subcutaneous injection apparatus, as a "virtual reality" milieu.

Figure 5:
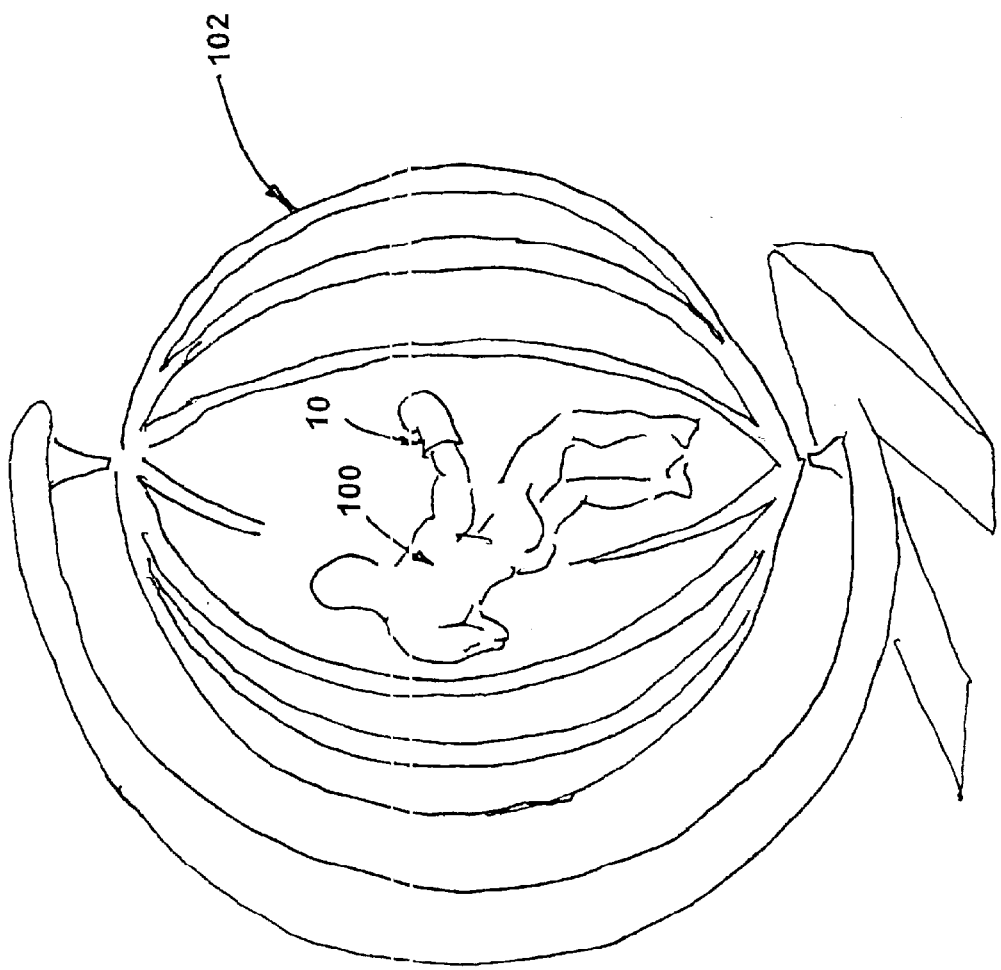
FIG. 5 is a perspective view of a virtual reality application of the present invention.

More specifically, as shown in FIG. 5, activity cage 102 provides 360 degree, three-dimensional real-time external stimuli. This in turn can be used to provide a virtual reality sensory stimulus and feedback such as obtained from the responses of a real or virtual opponent, thereby providing a virtual gaming application, such as a "cyber-saber" capability. A refined embodiment of the exoskeletal support-feedback capability can provide for "weightless" electromagnetic suspension applied to the pressure suit appropriately fitted in the external fabric with ferro-reactive sites such as well-known to the art of railway transportation, whereby tram cars are suspended from the track by means of magnetic repulsion. Such an "activity cage" could substantially obviate on-site participation of an operator of hazardous material handling equipment, or equipment placed in a lethal or toxic environment, such as outer space or deep sea. The "activity cage" furthermore obviates on-site participation of a combat pilot in "dogfight" situations where virtual reality displays to the sensory feedback apparatus supplied by the "activity cage," and the therapeutic input gauntlet provides inputs to control an aircraft or mobilized combat modality (tank, submarine, automobile, etc.), in each case out of harm's way.

An information-based electronic housing for a user clad in a pressurized suit is further accessorized to an external layer of electromagneto ferrocladding sufficient to buoy in free-fall within the repulsive structure formed by the encircling electromagnets positioned at an optimal distance at various rays of 360 degrees stereotaxically. From such suspension the user, clad in ferroactive garment, becomes the target for ruby-laser mapping. In alternative phases (and possibly two laser tracking beams, one internalized), the first adapting to the user's unique spatial characteristics and agility as in the facsimile experiment; the second phase actuates programled movement. By alternation of such means is the user's gestural input interfaced to a virtual program that is interactive whereby programmed variance over capacitance is read like a CD-ROM by the laser-photoelectromagnetic pick-up over the entire photoelectromagnetic environment such that variance of resistance over selective surround magnets can be increased or decreased to provide varying levels of magnetic resistance to the user's existential musculoskeleton encased in the ferroclad, thereby providing virtual feedback reality as touch. By such means can a user experience movement executed and recorded by similar stereotaxic means, of a balleriniste in flight; of a ski-jumper or boarder, in the safety of the cage. In other words, the movement will be completed as programmed.

Such photoelectromagnetic environment could provide therapeutic exercise for movement-impaired patients, such as those afflicted by multiple-sclerosis, and actuate extremity limb automation for congenital and amputee challenges, as well as a gravity platform for space flight.

Operational but redundant is a system whereby counterweights, spring tension and winch-pulley arrangements suspend the user, like a knight-of-old in armor, upon his steed.

As an additional embodiment, the instant invention can be adapted to operate as a telephone "touch-tone" keypad for telecommunication and network website/phoneline access, or as a cable TV and multiple appliance remote control keypad input device.

While embodiments of the invention have been illustrated and described, it is not intended that these embodiments illustrate and describe all possible forms of the invention. Rather, the words used in the specification are words of description rather than limitation, and that various changes may be made without departing from the spirit and scope of the invention.

What is claimed is:

1. A therapeutic and computer input gauntlet comprising:
   a housing arranged to fit about and support a user's arm and hand;
   a set of finger switches positioned on the housing so as to be selectively actuatable by movement of the user's fingers;
   a stalk pivotally mounted to the housing so as to be moveable from a first position extending across the user's palm to a second position in which an outer end of the stalk extends away from the user's arm, wherein the stalk includes an input device mounted to thereon such that when the stalk is moved to the second position, the input device is positioned so as to be actuatable by the user's thumb; and
   an output connector for providing output signals corresponding to actuation of the finger switches and ball-mouse.

2. The computer input device of claim 1 wherein the stalk mounted input device comprises a ball-mouse device mounted to the outer end of the stalk.

3. The computer input device of claim 2 wherein the ball-mouse is arranged to provide a cursor control output when actuated by the user's thumb.

4. The computer input device of claim 1 further comprising a self-adjustable, elastic wrap located between the user's arm and the housing, wherein the wrap is arranged to be pressurized to secure and immobilize the user's arm from the wrist to the elbow.

5. The computer input device of claim 4 wherein the pressurized wrap is further arranged to be selectively filled with a fluid to modify the temperature of the wrap.

6. The computer input device of claim 4 wherein the pressurized wrap is further arranged to provide be inflated to provide external monitoring of the user's blood pressure.

7. The computer input device of claim 1 wherein the stalk is dimensioned and positioned so to immobilize the phalanges of the user's palm when in the first position, thereby restricting movement of the hand but allowing the fingers to move freely.

8. The computer input device of claim 1 further comprising a track mounted lengthwise along the housing, and an MRI scanning device coupled to the track and moveable thereon.

* * * * *